US007237141B2

(12) United States Patent
Fredin

(10) Patent No.: US 7,237,141 B2
(45) Date of Patent: Jun. 26, 2007

(54) METHOD FOR RECOVERING DATA FROM A REDUNDANT STORAGE OBJECT

(75) Inventor: Gerald J. Fredin, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 945 days.

(21) Appl. No.: 10/601,265

(22) Filed: Jun. 19, 2003

(65) Prior Publication Data

US 2004/0268178 A1 Dec. 30, 2004

(51) Int. Cl.
G06F 11/00 (2006.01)
(52) U.S. Cl. ............................................ 714/6; 714/20
(58) Field of Classification Search .................... 714/6, 714/16, 20, 21, 747
See application file for complete search history.

(56) References Cited

U.S. PATENT DOCUMENTS

| | | | | |
|---|---|---|---|---|
| 4,654,847 A | * | 3/1987 | Dutton | 714/6 |
| 5,155,845 A | * | 10/1992 | Beal et al. | 714/6 |
| 5,581,754 A | * | 12/1996 | Terry et al. | 707/8 |
| 5,740,348 A | * | 4/1998 | Cunliffe et al. | 714/6 |
| 5,787,247 A | * | 7/1998 | Norin et al. | 709/220 |
| 5,845,328 A | * | 12/1998 | Maya et al. | 711/162 |
| 6,088,815 A | * | 7/2000 | West et al. | 714/15 |
| 6,233,696 B1 | * | 5/2001 | Kedem | 714/6 |
| 6,618,794 B1 | * | 9/2003 | Sicola et al. | 711/154 |
| 6,742,137 B1 | * | 5/2004 | Frey, Jr. | 714/6 |
| 6,892,277 B1 | * | 5/2005 | Bergsten | 711/118 |
| 7,130,657 B1 | * | 10/2006 | Sampath et al. | 455/561 |

* cited by examiner

Primary Examiner—Gabriel Chu
(74) Attorney, Agent, or Firm—Suiter Swantz PC LLO

(57) ABSTRACT

A method for recovering data from a redundant storage object comprises a command, executable upon a redundant storage object, which provides a mechanism for discovering the existence of copies of the data image and the number of copies of the data image available. The present invention further provides the capability of retrieving a copy of the data image(s) from underlying virtualization layers. By querying specific layers of the IO path to determine if a specific layer has copies of the data image, the number of copies may be determined and specified copies of the data image retrieved. This allows higher layers within a system to perform recovery if incorrect data is detected.

26 Claims, 5 Drawing Sheets

METHOD FOR RECOVERING DATA FROM A REDUNDANT STORAGE OBJECT

FIELD OF THE INVENTION

The present invention generally relates to the field of computing systems, and particularly to recovering data stored in file systems or raw volumes.

BACKGROUND OF THE INVENTION

Computer applications store data in file systems or raw volumes without knowledge of the underlying structure of the storage object. This abstraction allows virtualization of the storage so that redundancy and other storage features can be implemented transparently to the application. However, if the application maintains metadata for checking the integrity of the data when it is read from the storage object, it does not have a mechanism for retrieving a redundant copy of the data. For example, an application could generate a cyclic redundancy code (CRC) and append it to the data written to a mirrored volume or disk array that implements mirroring. The fact that the data is mirrored is transparent to the application. Under normal conditions, the volume manager or disk array would detect any errors that occur and retrieve the data from the mirrored copy, returning it to the application without any indication of error. If the application should detect that the CRC on a read block of data is incorrect, it does not have the capability to read the alternate data image to check it for accuracy.

Unfortunately, the existing solutions to this problem are to retry the read operation or recover data from a back-up device. A retry of the read operation could be attempted, hoping that a subsequent read might be executed to the mirror image of the data instead of the primary storage location. The most likely outcome would be that the same data image would be returned from some underlying cache memory. In the case of RAID 5, where the only alternate data image available must be reconstructed from the other drives in the redundancy group, the alternate image would never be accessed unless the primary copy indicated an error to the disk array.

Therefore, it would be desirable to provide a mechanism to recover from certain types of errors without going through the tedious off-line process of restoring data from a back-up device.

SUMMARY OF THE INVENTION

Accordingly, the present invention is directed to a method for recovering data from a redundant storage object. The present invention provides a mechanism for discovering the existence of alternate data images and the number of alternate images available. The present invention further provides the capability of retrieving specific data images from underlying virtualization layers. By querying specific layers of the IO path to determine if a specific layer has multiple copies of a data block, the number of copies may be determined and specified copies of the data retrieved. This allows higher layers within a system to perform recovery if incorrect data is detected.

In an exemplary embodiment of the present invention, once an error is detected in a cyclic redundancy code associated with a data image read from a redundant storage object, an index is initialized and a command is sent to retrieve alternative copies of the data image from the redundant storage object. If no copy of the data image is found then an unrecovered error handler routine is executed. If a specific copy of the data image is retrieved, the index is incremented and the data is checked for errors. The error detection is focused on the CRC associated with the copy of the data image. However, it may be that other errors, such as those that may exist in protection data associated with the copy of the data image may be checked for errors as well. The index monitors the retrieval of the specific copy(s) of the data image(s) keeping a log of all copies retrieved to ensure that redundancy in the error check of the specified copies is avoided. If an error is detected in the specific copy of the data image retrieved the present invention re-issues the command to retrieve an additional alternative copy of the data image from the redundant storage object. When the redundant storage object has no more copies of the data to send, it returns an error and an unrecovered error handler is executed. If no error is detected in the copy retrieved then a re-write of the data image is initiated before normal processing continues. Since the redundant storage object manages all copies of the data, a re-write will update all copies. This corrects any erroneous copies of the data that may have existed in the storage object.

In another exemplary embodiment of the present invention, once an error is detected in a cyclic redundancy code associated with a data image read from a redundant storage object a first command is sent to retrieve a count of copies of the data image in the redundant storage object. The count provides the total number of copies available for retrieval. An index is established and monitors the retrieval of the specific copy(s) of the data image(s) keeping a log of all copies retrieved to ensure that redundancy in the error check of the specified copies is avoided. If no alternative copies of the data image are available then an unrecovered error handler routine is executed. If alternative copies of the data image are available then a second command is sent to retrieve specific alternative copies of the data image from the redundant storage object. Once a specific copy of the data image is retrieved the index is incremented and the data is checked for errors. The error detection is focused on the CRC associated with the copy of the data image. However, it may be that other errors, such as those that may exist in protection data associated with the copy of the data image may be checked for errors as well. If an error is detected in the specific copy of the data image retrieved the present invention re-issues the command to retrieve an additional alternative copy of the data image from the redundant storage object. If no error is detected in the copy retrieved then a re-write of the data image is initiated before normal processing continues. Since the redundant storage object manages all copies of the data, a re-write will update all copies. This corrects any erroneous copies of the data that may have existed in the storage object.

In a third aspect of the present invention, the detection of an error in a data image read from a redundant storage object initiates the sending of an incorrect data image back to an IO path component where the incorrect data image is checked against all existing copies of the data image in the redundant storage object. From this check procedure it is determined if a copy of the data image exists which differs from the incorrect data image. Once it is determined that alternative copies of the data image exist in the redundant storage object then recovery of the data may proceed as outlined in either of the first two exemplary embodiments discussed above.

In a fourth aspect of the present invention, a computing system is provided for recovering data from a redundant storage object. The computing system includes a host computer assembly in communication with the redundant storage object. The host computer assembly is enabled to execute one of the above described methods for recovering data from the redundant storage object.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
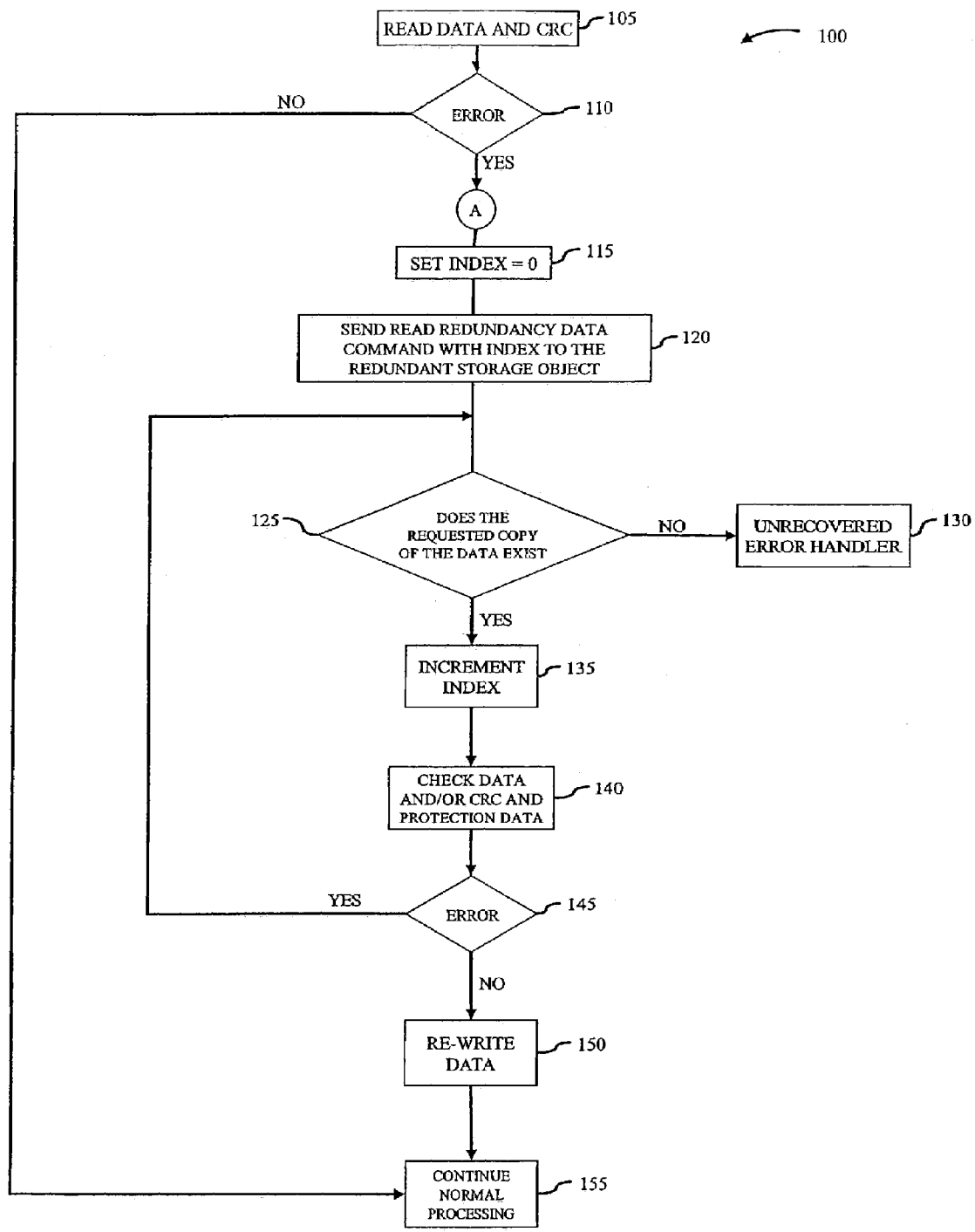
FIG. 1 is a flowchart illustrating an application algorithm for using the Read Redundancy Data (RRD) command to recover data in accordance with an exemplary embodiment of the present invention.

Referring generally now to FIGS. 1 through 5, exemplary embodiments of the application algorithm capable of performing the method of the present invention are shown. In FIG. 1, a method 100 for recovering data from a redundant storage object (RSO) after an error is detected is shown. The method involves the application implementing a first command, such as a Read Redundancy Data (RRD) command in a component of the Input/Output (IO) path of the redundant storage object (RSO). The RRD command returns a specific copy of a data image from the RSO. It is understood that the command may use an IO Control (IOCTL) message or various other forms of communication as contemplated by one of ordinary skill in the art, to make requests to the underlying components of the IO path. A system capable of executing the method of the present invention comprises a host computer assembly in communication with an array controller of a Redundant Array of Independent Disks (RAID) storage system. It is understood that the system defined by the present invention is exemplary and should not be read as limiting, various systems as contemplated by one of ordinary skill in the art may be employed without departing from the scope and spirit of the present invention. Further, the method may be implemented from the host computer assembly (i.e., volume manager in the host software), the array controller, filer head, or other systems as may be contemplated by one of ordinary skill in the art.

In step 105 data is read from the redundant storage object (RSO) and a check of the data and the cyclic redundancy code is initiated. It is understood that the present invention is enabled to perform a check of data with the CRC coupled to it or to receive data without the CRC coupled to it and go and find the CRC associated with the data in a secondary location. Determination of whether an error exists in the data and/or the cyclic redundancy code associated with the data is made in step 110. If no error is found then the method proceeds to step 155 where normal processing continues. If an error is found then in step 115 an index is initialized to zero and in step 120 the RRD (first command) is sent to the RSO for execution. In application, the RRD being sent requests a specific copy of the data identified as the "zero" copy. In step 125 it is determined whether the requested copy of the data exists in the RSO. If the requested copy of data does exist the copy is retrieved and sent to the array controller. It is understood that the copy of data is retrieved and sent to the location from which the application algorithm of the present invention is being executed. If it is determined that the requested copy does not exist an unrecovered error handler routine is executed in step 130 indicating that the copy does not exist.

If a copy of the data is found then, in step 135, the index of the number of copies of the data image found is incremented. The index in this case is used as a generic reference to a system for maintaining a record of the copies of the data image found. For instance, the record may include the copy location in the RSO, an indicator for identifying in the RRD which copy is to be retrieved, and other various information to be associated with the copy of the data image as may be contemplated by one of ordinary skill in the art. It is understood that the index application referred to may comprise various systems, such as a register, count, and the like, without departing from the scope and spirit of the present invention.

In the preferred embodiment, the data and/or the cyclic redundancy code and protection data associated with the data image returned is checked in step 140. Protection data may include time stamp data or other data which ensures that the copy of the data image is not an old image. An old image is one that is stale, a previous data image that has since been replaced with a more updated version. It is understood that the check performed in step 140 may be limited to checking the cyclic redundancy code and/or the protection data however, it may also include a check of other relevant information associated with the data image. In step 145, if no error is found in the data and/or the CRC or the protection data then the data image is re-written into the redundant storage object in step 150. The re-write operation covers all existing copies of the data image in the redundant storage object. After a successful write operation in step 150, the method proceeds to step 155 and continues normal processing. If in step 145 an error is discovered in the data and/or CRC or the protection data then the method proceeds back to step 120 and re-issues the RRD command requesting the next alternative copy of the data. Thus, the request may be repeated until a response from the RSO indicates that the requested copy does not exist.

The Read Redundancy Data (RRD) command is designed to return a specific copy of the data image found in the redundant storage object (RSO). For example, the application may begin by issuing the RRD command requesting a copy of the data identified as copy zero. If the copy zero is found but includes errors, then the application may issue a new RRD command requesting a copy of the data identified as copy one. This may continue until the requested copy of data cannot be found in the RSO. It is understood that other implementations of the Read Redundancy Data (RRD) command may be designed to return a variety of specified data images as contemplated by one of ordinary skill in the art. By issuing the Read Redundancy Data (RRD) command the Input/Output (IO) path is queried until the response from the IO path indicates that no further copies of the data image exist.

The redundant storage object (RSO) may have a physical profile as a Redundant Array of Independent Disks (RAID) storage shelf, tower storage apparatus, rack-mount storage apparatus, desktop storage apparatus and the like. The RSO (storage system enclosures) may include any number and type of storage devices, such as a hard disk drive. In an exemplary embodiment the RSO may comprise seven to fourteen hard disk drives. The RSO may come in a variety of structures such as a RAID storage shelf, just a bunch of disks (JBOD) and the like without departing from the spirit and scope of the present invention. Each RSO system may be structured to provide functionality in a particular way. For instance, the communication channels used within the RSO system may include standard computer cable channels, fibre channels, fibre-optic channels and the like. Access and control of the RSO system may be through controllers (e.g., filer heads, etc . . . ) which may utilize SCSI controller commands, a SCSI-3 enclosure services command set, or other command languages as may be contemplated by one of ordinary skill in the art. Further, the RSO system may serve a specific utility such as providing extended data availability and protection (EDAP) through internal structuring which enables functioning of the RSO as a mirrored disk system, mirroring RAID system, parity RAID system and the like.

In the exemplary system described for FIG. 1, the array controller may be a filer head included within the RSO system. The filer head may comprise an information handling system that specializes in storing and serving data on the RSO (i.e., RAID storage shelves). One filer head may operate multiple RSO's (multiple RAID storage shelves). Other RSO controllers may be storage assembly controllers and other devices known and used by persons of ordinary skill in the art. These control devices may allow information to flow into and out of the RSO (RAID storage shelf) via the drive components within the RSO.

Figure 2:
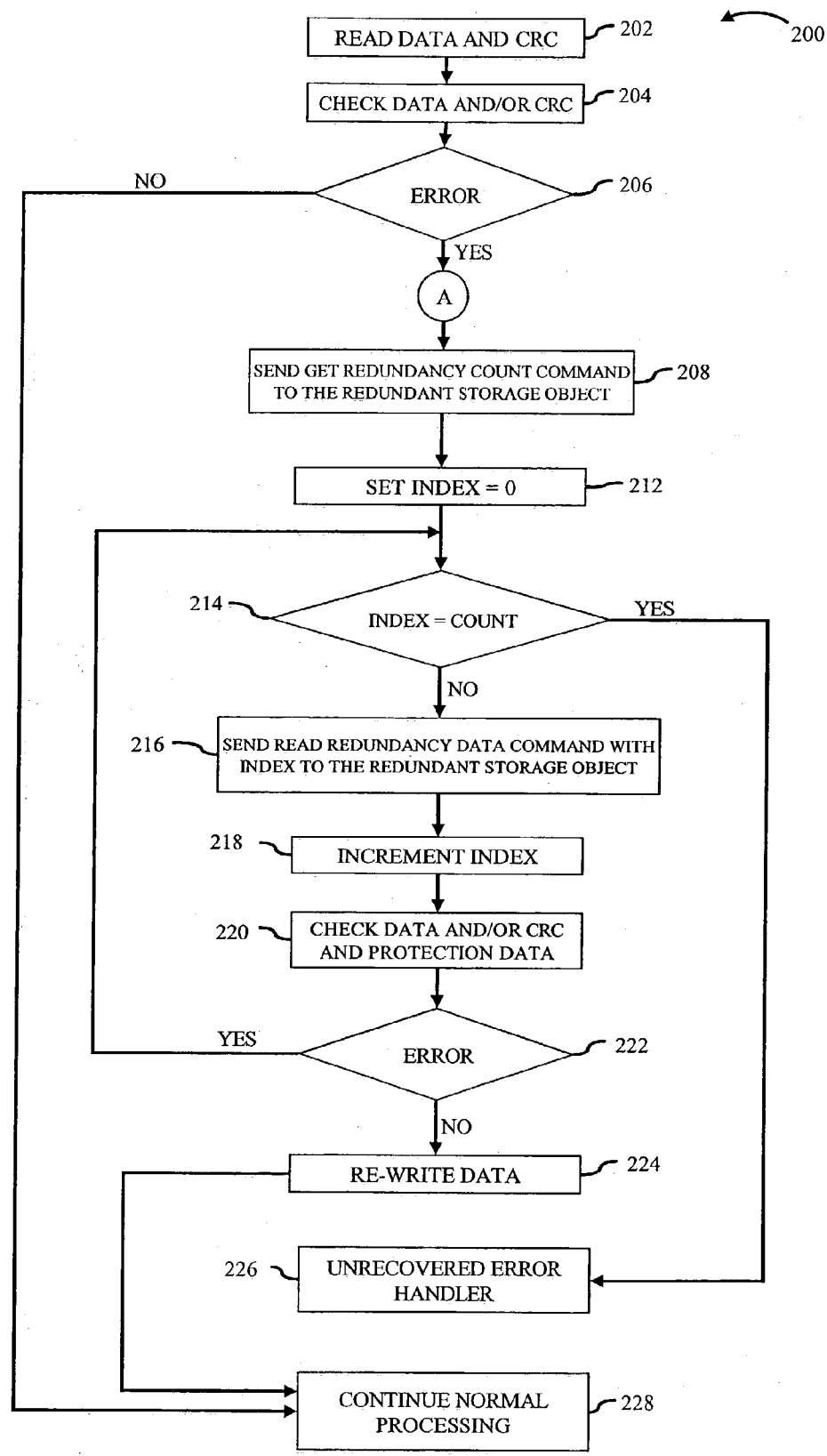
FIG. 2 is a flowchart illustrating an application algorithm for using the Get Redundancy Count (GRC) command and Read Redundancy Data (RRD) command to recover data in accordance with an exemplary embodiment of the present invention.

Referring now to FIG. 2, a method 200 for recovering data from a redundant storage object after an error is detected is shown. It is understood that this method may be implemented through a system as described previously in FIG. 1. In step 202, a read data application is executed followed in step 204 by a check of the data and/or the cyclic redundancy code (CRC). Step 206 determines if an error is detected in the data and/or the CRC. If no error is detected then step 228 continues normal processing. If an error is detected, in step 208, a Get Redundancy Count (GRC) command is implemented. The Get Redundancy Count (GRC) command returns the total number (count) of existing copies of the data image found in the redundant storage object. As discussed previously with regards to the RRD command, the GRC command is implemented in a component of the IO path. Additionally, the GRC may be enabled to provide other information as contemplated by one of ordinary skill in the art. For instance, the GRC may enable the classification of the data found or provide the data in a structured hierarchy format. In step 212, the application establishes an index and sets its value at zero. The index is an internal counter used by the host system to keep track of how many copies have been processed. Then in step 214 the count is compared against the index. If the index equals the count then the host system has looked at all available copies of the data, thus, the error cannot be recovered. When this condition occurs, the unrecovered error handler routine is executed in step 226. If the index does not equal the count, step 216 issues the RRD command to the IO component path. The RRD locates and returns specific copies of the data image to the host system. Once a copy is found and returned to the host system the index is incremented in step 218. In step 220 the data and/or the CRC and protection data associated with the copy of the data image is checked. If no error is detected in step 222 the data is re-written in step 224 and normal processing is resumed in step 228. The re-write updates all copies of the data image then existing in the redundant storage object. If an error is detected the process returns to step 214 to verify the index and count equivalence and proceed forward from that point.

Figure 3:
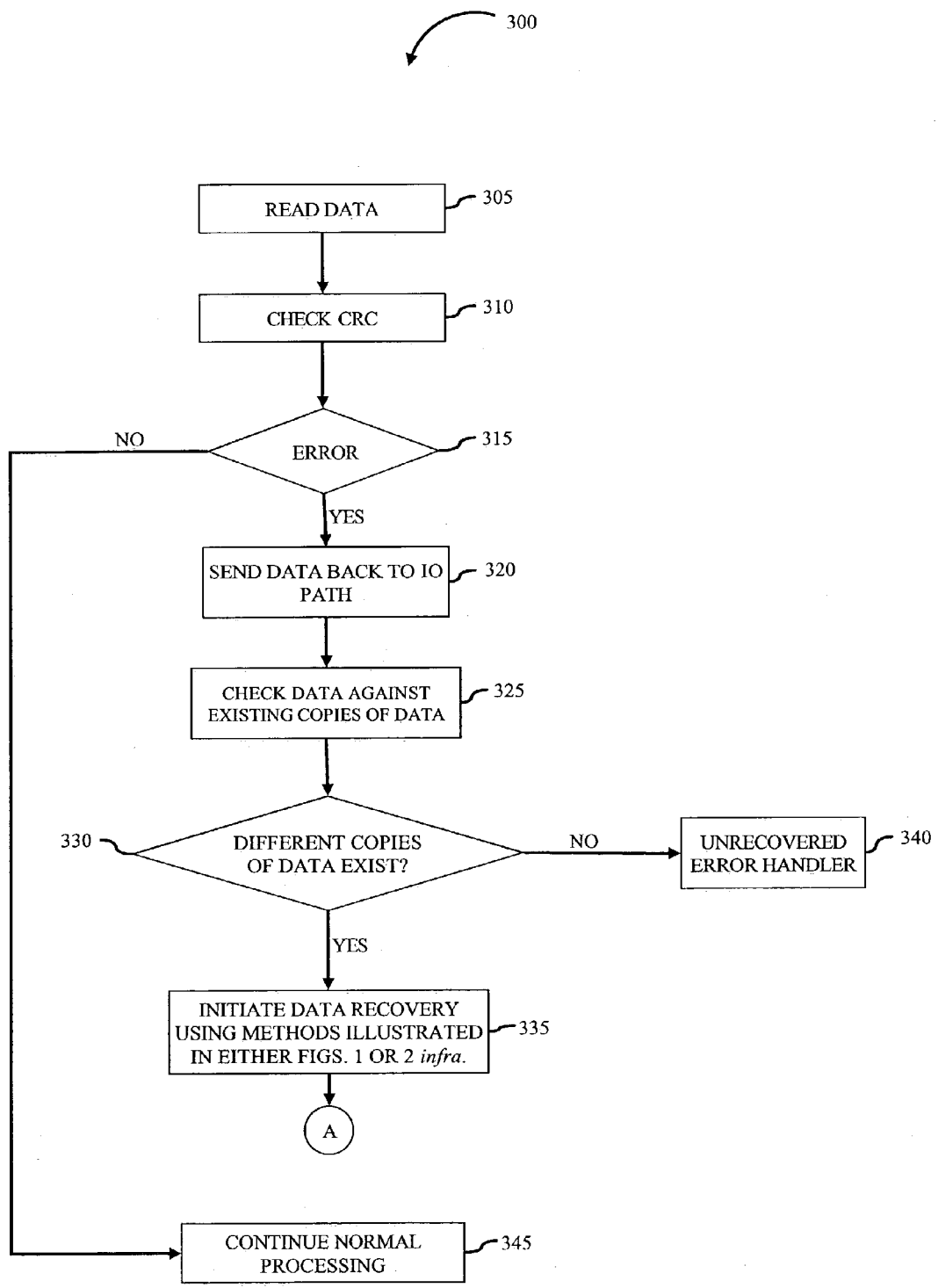
FIG. 3 is a flowchart illustrating an application algorithm for detecting the existence of a different copy of data stored in a redundant storage object.

A method 300 for detecting the existence of a different copy of data stored in a redundant storage object and then recovering data from the redundant storage object is shown in FIG. 3. In step 305 a read data application is executed followed by a check of the data and/or the cyclic redundancy code (CRC) in step 310. If no error is detected in the data and/or the cyclic redundancy code then the method proceeds to step 345 where normal processing continues. If an error is detected in the data and/or the cyclic redundancy code (CRC) in step 315, then in step 320 the incorrect data image is sent back to the IO path. In step 325 the incorrect data image that was sent back to the IO path in step 320 is checked against the existing copies of data. In step 330 it is determined if the existing copies of the data in the redundant storage object are different from the incorrect data that has been sent back. If existing copies of the data differ from the incorrect data image then the process proceeds to step 335 where data recovery is initiated using either method as illustrated and described in FIGS. 1 or 2. If there are no existing copies of the data image in the redundant storage object which differ from the incorrect data image then in step 340 an unrecovered error handler routine is executed. It is understood that the above detection method is exemplary and other methods of detecting errors in redundant storage objects may be employed with the data recovery methods of the present invention without departing from the scope and spirit of the present invention. Exemplary systems capable of executing the above method have been previously discussed in FIGS. 1 and 2.

Figure 4:
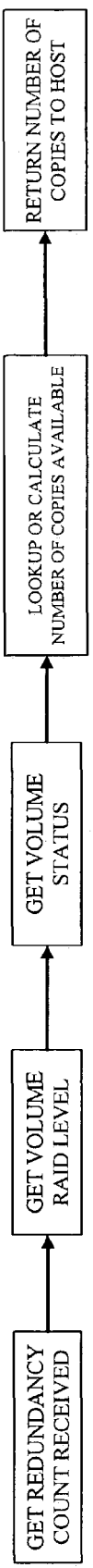
FIG. 4 is a flowchart illustrating an implementation of the Get Redundancy Count (GRC) command in a component of the IO path.

FIG. 4 illustrates an exemplary implementation of the Get Redundancy Count GRC) command in a component of the IO path. Upon receipt of the GRC the redundant storage object, preferably a RAID system, implements a get volume RAID level application. This specifies the RAID configuration of the volume that is to be searched. For example, RAID systems may be implemented as RAID 0 through RAID 6 configurations. Results of the get volume RAID level may indicate that the volume has no redundancy (RAID 0), one redundant copy (RAID 5), or multiple copies (RAID 1 or RAID 6). This establishes the number of copies of data available in a fully functional RSO that the GRC is being implemented upon. This is followed by the get volume status function which determines the overall status of the RAID volume to be searched. For instance, it may be determined that the volume specified in the get volume RAID level application is RAID 5. The volume status command determines if RAID 5 volume is operational and accessible, operating in a degraded mode due to component failures, or that the volume has become non operational and cannot be accessed at this time. This is critical to the functioning of the GRC command as it looks-up or calculates the number of copies of data that are available in the specified RAID volume based on access to the volume within the RAID system. After the number of copies of data has been established the number is returned to the host. The host may be a variety of devices, such as a computer, an array controller, filer head, and the like, capable of executing the GRC within the redundant storage object.

As stated previously, the GRC command is implemented in a component of the IO path which allows for higher layers within an exemplary system, as described in FIGS. 1 and 2, to perform recovery if and when incorrect data is detected. The implementation of the present invention in these higher layers enables a system, such as the RAID system discussed above, to maintain standard RAID operation but also participate in recovering data when errors are detected by the higher layers. This may be advantageous in systems where access, end-to-end data protection, and performance of the system are critical.

Figure 5:
FIG. 5 is a flowchart illustrating an implementation of the Read Redundancy Data (RRD) command in a component of the IO path.

FIG. 5 illustrates an exemplary implementation of the Read Redundancy Data (RRD) command in a component of the IO path. Upon receipt of the RRD command the available copy of the data found in the redundant storage object is indexed and then the source of the copy of the data is determined by the index value. After the source is determined then the data is read from the source and returned to the host system. Sources of data may include primary copies, redundant copies, cached data, and data reconstructed using parity techniques in the RSO. As discussed in FIG. 4 the host may be a variety of devices, such as a computer, an array controller, filer head, and the like, capable of executing the RRD within the redundant storage object.

Through the host system, a utility can provide the user with the ability to execute the individual steps of the recovery process. These include scanning for a CRC error, requesting the number of redundant copies with the GRC command, requesting a specific copy with the RRD command, and re-writing a specific block of data. This utility allows diagnosis of problems by enabling the user to find locations of incorrect data, retrieve and analyze the incorrect data, and manually fix any inconsistencies.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the method for recovering data from a redundant storage object of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for recovering data from a redundant storage object, comprising:
   detecting an error in a data image, during a read of the data image from the redundant storage object;
   establishing an index for monitoring the retrieval of a specific copy of the data image and keeping a log of all copies retrieved to ensure that redundancy in the error check of the specific copies is avoided;
   sending a first command, to the redundant storage object, requesting a different copy of the data image until the response from the redundant storage object indicates that the requested copy does not exist;
   retrieving the different copy of the data image from the redundant storage object when the different copy exists;
   incrementing the index;
   determining if an error exists in the retrieved different copy of the data image retrieved;
   and re-writing the data image with the retrieved different copy of the data image that is determined to be errorless and continuing processing of the redundant storage object.

2. The method of claim 1, further comprising the step of initiating an unrecovered error handler if no copy of the data image is found in the redundant storage object.

3. The method of claim 2, further comprising the step of sending an incorrect data image back to the redundant storage object after an error is detected in the data image read from the redundant storage object, checking the incorrect data image against all existing copies of the data image, and determining if a copy of the data image exists which differs from the incorrect data image.

4. The method of claim 3, wherein the steps of the method are executed on an underlying component of the Input/Output path of the redundant storage object.

5. The method of claim 1, wherein the redundant storage object is selected from the group consisting of a redundant array of independent disks, volume manager in the host system software, or filer head.

6. The method of claim 5, wherein the redundant array of independent disks further comprises an array controller.

7. The method of claim 1, wherein the method is executed by a computing system in communication with the redundant storage object.

8. A method for recovering data from a redundant storage object, comprising:
   detecting an error in a data image, during a read of the data image from the redundant storage object;
   sending a first command, to the redundant storage object, requesting a count of copies of the data image that exist in the redundant storage object;
   establishing an index for monitoring the retrieval of a specific copy of the data image and keeping a log of all copies retrieved to ensure that redundancy in the error check of the specific copies is avoided;
   determining if the count of copies of the data image that exist in the redundant storage object equals the index;
   sending a second command, to the redundant storage object, when the count is greater than the index, requesting a different copy of the data image;
   retrieving the different copy of the data image from the redundant storage object when the different copy exists;
   incrementing the index;
   determining if an error exists in the retrieved different copy of the data image retrieved by the second command;

and re-writing the data image with the retrieved different copy of the data image that is determined to be errorless and continuing processing of the redundant storage object.

9. The method of claim 8, further comprising the step of initiating an unrecovered error handler if the count of copies of the data image in the redundant storage object is equal to the index.

10. The method of claim 9, further comprising the step of sending an incorrect data image back to the redundant storage object after an error is detected in a data image read from the redundant storage object, checking the incorrect data image against all existing copies of the data image, and determining if a copy of the data image exists which differs from the incorrect data image.

11. The method of claim 10, wherein the steps of the method are executed on an underlying component of the Input/Output path of the redundant storage object.

12. The method of claim 8, wherein the redundant storage object is selected from the group consisting of a redundant array of independent disks, volume manager in the host system software, or filer head.

13. The method of claim 12, wherein the redundant array of independent disks further comprises an array controller.

14. The method of claim 8, wherein the method is executed by a computing system in communication with the redundant storage object.

15. A method for recovering data from a redundant storage object, comprising:
sending an incorrect data image back to the redundant storage object after an error is detected in a data image read from the redundant storage object, requesting a check against all existing copies of the data image in the redundant storage object, and determining if a copy of the data image exists which differs from the incorrect data image;
sending a get redundancy count command that retrieves a count of copies of the data image stored in the redundant storage object, establishes an index, and determines if the count is equal to the index;
and sending a read redundancy data command, when the count is greater than the index, requesting a different copy of the data image until the response from the redundant storage object indicates that the requested different copy does not exist, retrieving the different copy of the data image, determining if an error exists in the retrieved different copy of the data image, re-writing the data image with the retrieved different copy of the data image which is found to be errorless, and continuing processing of the redundant storage object.

16. The method of claim 15, further comprising the step of initiating an unrecovered error handler if the count of copies of the data image stored in the redundant storage object is equal to the index.

17. The method of claim 16, wherein the steps of the method are executed on an underlying component of the Input/Output path of the redundant storage object.

18. The method of claim 15, wherein the redundant storage object is selected from the group consisting of a redundant array of independent disks, volume manager in the host system software, or filer head.

19. The method of claim 18, wherein the redundant array of independent disks further comprises an array controller.

20. The method of claim 15, wherein the method is executed by a computing system in communication with the redundant storage object.

21. A computing system for recovering data from a redundant storage object, comprising:
a host computer assembly in communication with the redundant storage object, the host computer assembly reading a data image from the redundant storage object and determining the data image contains an error;
a first command sent by the host computer assembly to the redundant storage assembly, the first command retrieves a count of copies of the data image stored in the redundant storage object, establishes an index, and determines if the count equals the index;
and a second command sent by the host computer assembly to the redundant storage assembly, when the count is greater than the index, requesting a different copy of the data image until the response from the redundant storage object indicates that the requested different copy does not exist, retrieving the different copy of the data image, determining if an error exists in the different copy of the data image, re-writing the data image with the retrieved different copy of the data image which is found to be errorless, and continuing processing of the redundant storage object.

22. The computing system of claim 21, further comprising an unrecovered error handler being initiated if the count of the number of copies of the data image in the redundant storage object is equal to the index.

23. The computing system of claim 22, further comprising a third command for sending an incorrect data image back to the redundant storage object after an error is detected in a data image read from the redundant storage object, checking the incorrect data image against all existing copies of the data image, and determining if a copy of the data image exists which differs from the incorrect data image.

24. The computing assembly of claim 23, wherein the functions performed by the computing assembly are executed on an underlying component of the Input/Output path of the redundant storage object.

25. The computing system of claim 21, wherein the redundant storage object is selected from the group consisting of a redundant array of independent disks, volume manager in the host system software, or filer head.

26. The computing system of claim 25, wherein the redundant array of independent disks further comprises an array controller.

* * * * *